United States Patent [19]

Olschewski et al.

[11] 4,307,920
[45] Dec. 29, 1981

[54] BALL BEARING

[75] Inventors: Armin Olschewski, Schweinfurt; Manfred Brandenstein, Eussenheim; Lothar Walter, Schweinfurt; Horst M. Ernst, Eltingshausen, all of Fed. Rep. of Germany

[73] Assignee: SKF Kugellagerfabriken GmbH, Schweinfurt, Fed. Rep. of Germany

[21] Appl. No.: 56,737

[22] Filed: Jul. 11, 1979

[30] Foreign Application Priority Data

Jul. 26, 1978 [DE] Fed. Rep. of Germany ....... 2832744

[51] Int. Cl.³ ............................................. F16C 29/06
[52] U.S. Cl. .................................................... 308/6 C
[58] Field of Search ........................................ 308/6 C

[56] References Cited

U.S. PATENT DOCUMENTS

| 3,037,821 | 6/1962 | Schutz | 308/6 C |
|---|---|---|---|
| 3,042,459 | 7/1962 | Magg | 308/6 C |
| 3,265,449 | 8/1966 | Jahn | 308/6 C |
| 3,464,745 | 9/1969 | Schaeffler | 308/6 C |
| 3,565,494 | 2/1971 | Linz et al. | 308/6 C |

FOREIGN PATENT DOCUMENTS

| 1575658 | 1/1970 | Fed. Rep. of Germany | 308/6 C |
|---|---|---|---|
| 2558196 | 7/1976 | Fed. Rep. of Germany | 308/6 C |
| 494545 | 12/1975 | U.S.S.R. | 308/6 C |

Primary Examiner—Richard R. Stearns
Attorney, Agent, or Firm—Daniel M. Rosen

[57] ABSTRACT

A linear moving ball bearing has a cage with axially extending ball guide channels joined at their ends by semi-circular turn around channels, one of the axially extending channels being open radially inward for load carrying balls and the other axially extending guide channel directing unloaded balls. An outer sleeve closely surrounds the cage as it continues in the region of the axially extending guide channels, and has crescent shaped slots extending therethrough aligned with the semicircular turn around channels.

9 Claims, 3 Drawing Figures

BALL BEARING

BACKGROUND OF THE INVENTION

This invention relates to a ball bearing comprised of a cage having a plurality of ball guides in the form of axially extending guide channels for the load-carrying and non-load-carrying balls and semicircular reversing or turn-around channels connecting pairs of these guide channels together. In such bearings, endless rows of balls are provided in the guide channels, and an outer sleeve closely surrounds the cage and has ball races axially disposed in the bore. The axially extending races for the non-load-carrying balls lie on a greater diameter in the bearing than the axially extending races for the load-carrying balls, and the axially extending races both for the load-carrying and for the non-load-carrying balls are closed off radially outwardly.

In a known ball bearing of this kind, the outer sleeve is made of relatively thick material, and axially extending recesses are formed in its inner bore to receive the non-load-carrying balls, the radially inwardly projecting sections between the recesses serving as races for the load-carrying balls. In the areas of the semicircular channels provided for the recirculation of continuous rows of balls, the inner bore of the outer sleeve is provided with truncoconical flares (i.e. in the shape of portions of the surfaces of truncated cones) leading to annular grooves. The bottom of this annular groove lies at the same diameter of the bearing as the return channels for the non-load-carrying balls. This known ball bearing requires a great amount of material and is quite expensive to manufacture. Furthermore, the radial dimensions of the outer sleeve are relatively great, so that the radial profile of the entire ball bearing is very high. The greater bearing weight necessitated by this arrangement is also disadvantageous in many applications.

A ball bearing is also known in which the outer sleeve is formed of a relatively thin tube having a plain inner surface surrounding the cage and having slots of lesser width than the diameter of the balls in the area in which the balls are not loaded. Depending on the thickness of this tube, the slots may be C-shaped, or solely of an axially extending configuration. The disadvantage of the C-shaped configuration of the slot is that, when the outer sleeve is hardened, the tongues of material enclosed by the C-shaped slots are subjected to a distortion, and the result is that, when the ball bearing is assembled, the balls are unable to roll perfectly in their guides and are pinched to a certain extent. Common to both of these last-named designs is the disadvantage that the strength of the outer sleeve is adversely affected in the area of its midsection by the slots, i.e., in the area in which the load-carrying zones are situated. The same applies also to the cage, whose islands, i.e., the portions between the guide channels of each continuous train of balls, are adequately joined to the rest of the cage ring only on one side, i.e., only in the area of the return channels, due to the only shallowly ascending turn guides and the thin cross sections in which this results. In the area of the races for the load-carrying balls, the cage has a slot open radially inward to allow the balls to contact the shaft. Due to these unfavorable circumstances, the manufacture of the cage from plastic, the material used primarily in the manufacture of the cage, presents great difficulty, especially in the small sizes, both in the production of the cages themselves and in the making of the dies for these cages. In the practical manufacture of these known ball bearings, the cage in the bore also has C-shaped slots formed therein, i.e., the turn channels are also open radially inwardly. In this case the balls also contact the shaft in the turn areas. This results in increased friction and wear.

SUMMARY OF THE INVENTION

The present invention is therefore directed to the provision of a ball bearing of the above described type, which has a low radial profile, and whose outer sleeve has improved strength at its midsection, i.e., in its load-carrying area. The components of the bearing of the invention are shaped such that a precise and accurately dimensioned manufacture with a minimum of rejects is possible, without special methods and apparatus.

Briefly stated, in accordance with the invention, by forming the bottom of the semicircular turn channels in the cage to rise convexly towards the circumference, the cage has a greater thickness at different points in the turn area as well, and this reinforces the islands. Furthermore, in these turn areas the balls are directed positively out of contact with the shaft, thereby substantially reducing friction and wear. It is even possible to form the return channels in the cage to open radially inward, since the "islands" in the cage are held sufficiently by the bridges in the turn around or reversing zone. To keep the radial profile low despite the radial excursion of the balls at the apex of the turn around areas or zones, slots are provided in the outer sleeve only in the area of these semicircular turns. These slots do not extend through the midsection of the sleeve, i.e., the section covering the load-carrying channels, so that in this area the outer sleeve is annular without any through openings. Distortion of this area in the hardening operation and the bulging of tongues impairing the installation and operation of the ball bearing are thereby not possible. The closed annular midsection has furthermore greater strength, thereby increasing the useful life of the bearing.

Advantageous embodiments of the ball bearing of the invention may also be provided, which on the one hand maintains the radial profile of the bearing as low as possible and on the other hand permits the parts to be manufactured substantially more simply and hence more economically.

BRIEF DESCRIPTION OF THE DRAWINGS

In order that the invention will be more clearly understood, it will now be disclosed in greater detail with reference to the accompanying drawings, wherein.

DETAILED DISCLOSURE OF THE INVENTION

Figure 1:
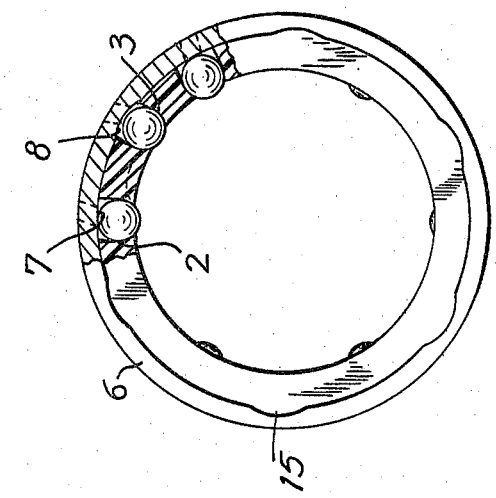
FIG. 1 is a partially cross-sectional view of a ball bearing of the invention.

Referring now to the drawings, the ball bearing is comprised of the cage 1 having a plurality of continuous ball guides distributed about its circumference. The ball guides each have an axially extending radially inwardly open guide slot 2 for the load-carrying balls, a likewise inwardly open guide channel 3 disposed parallel thereto for the non-load-carrying balls, and semicircular reversing channels joining these two guide channels together.

The ball bearing is also comprised of continuous rows of balls 5 disposed in the continuous ball guides, and an outer sleeve 6 fitted over the cage 1. This outer sleeve 6, which is made of thin material, has axially extending races 7 in its bore for the load-carrying balls and channels 8 for the return of the non-load-carrying balls. The outer sleeve 6 further has crescent-shaped openings 9 in the reversing channels 4 of the endless rows of balls, i.e., radially aligned with the reversing channels.

Figure 3:
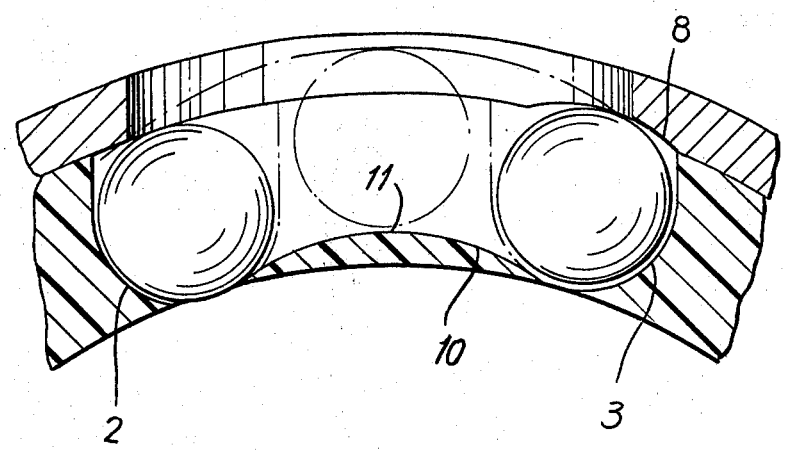
FIG. 3 is an enlarged cross-sectional view taken along line A—A of FIG. 2 in the area of the semicircular turns.

As best seen in FIG. 3, the semicircular reversing channels 4 in the cage 1 have bottoms 10 rising convexly towards the circumference of the bearing. This raises the balls away from the shaft (not shown) as they leave the load-carrying zone (guide slot 2), moves them radially outward to the apex 11 of the convex bottoms, and then guides them radially inward again to the beginning of the axially disposed guide channel 3 adjacent the return zone 8. The balls are able to travel this path due to the crescent shaped openings 9 in the outer sleeve 6, while nevertheless the radial profile of the ball bearing can be kept low.

Figure 2:
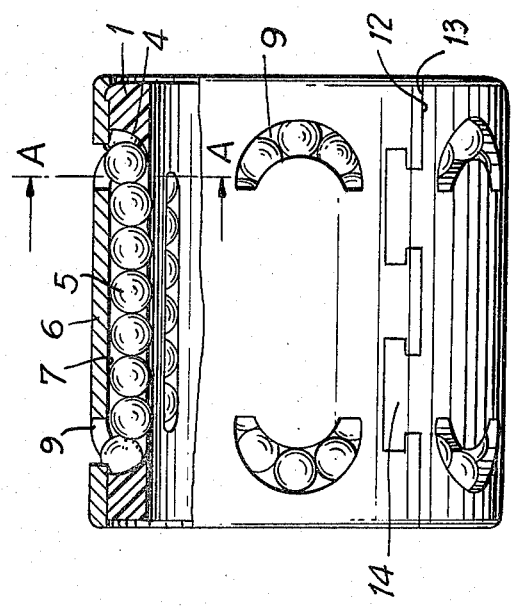
FIG. 2 is a partially cross-sectional side view of the ball bearing of FIG. 1.

It can be seen especially in FIG. 2 that the outer sleeve 6 has no opening, i.e., no slot on its exterior, in its middle section, i.e., in the area of the load-carrying zone, i.e., of the race 8, of each row of balls. This construction increases the strength of the outer sleeve in this area and furthermore prevents distortion of the parts when they are hardened.

Due to the convex configuration of the bottom 10 of the semicircular turn channels 4 in the cage 1, sufficient thickness of materials is present in the midsection or apex 11 to securely join the sections ("islands") of the cage which lie within the guide channels to the end rings for each row of balls. The outer sleeve 6 can best be made from a flat plate or sheet of metal in which the returns 8 and the crescent-shaped openings are made, the plate then being rolled to a cylindrical shape and joined at the abutments 12 and 13 by interlocking tabs 14 as seen in FIG. 2. Of course, other methods of joining the abutting edges of the sleeve 6 are possible, such as welding for example. In certain cases there may be no need to fasten the abutting edges together. In this case a variation of the envelope circle diameter of the load-carrying balls is possible, and hence the adjustment of the radial clearance between the ball bearing and the shaft.

The races 7 for the load-carrying balls can be formed directly by the inner bore in the outer sleeve. In certain applications it can be advantageous to provide races 7 adapted to the shape of the balls. Both the ball races 7 for the load-carrying balls and the return channels 8 for the non-load-carrying balls can be made by cutting or noncutting operations in the outer sleeve while it is still in the flat shape or after it has been rolled to the cylindrical shape. It is also feasible to axially extend the return channels 8 the entire length of the outer sleeve 6 and provide the cage 1 with radial projections 15 (see FIG. 1) adjacent the end rings to engage the terminal portions of the return channels 8 and thus avoid relative rotation between the cage 1 and the sleeve 6.

In accordance with the invention, it is preferred that the outer sleeve be formed of a sheet metal, and that the cage be formed of a plastic material. While, as above discussed, the return channels may be open radially inward, this is not absolutely necessary in accordance with the invention.

While the invention has been disclosed and described with reference to a single embodiment thereof, it will be apparent that variations and modifications may be made therein, and it is intended in the following claims to cover each such variation and modification as falls within the true spirit and scope of the invention.

What is claimed is:

1. In a linear ball bearing comprising a cage having a plurality of ball guides, each ball guide having axially extending guide channels for load-carrying and non-load-carrying balls and semicircular channels connecting pairs of said guide channels together, endless rows of balls disposed in said ball guides, and an outer sleeve extending axially over the cage and having ball races axially extending in its bore, the axially extending races for the non-load-carrying balls extending at a greater diameter of the bearing than the axially extending races for the load-carrying balls, and the axially extending races both for the load-carrying and for the non-load-carrying balls being closed off radially outwardly; the improvement wherein said semicircular channels in the cage have bottoms that rise convexly radially outward toward the circumference of the bearing between each pair of interconnected axially extending guide channels, said convex bottoms having apices between the respective axially extending guide channels, and the outer sleeve has crescent-shaped slots opening radially outward at least at said apices and extending substantially only in the portion of said outer sleeve adjacent said semicircular channels.

2. The ball bearing of claim 1 wherein the edges of the crescent shaped slots are closer to one another than the diameter of said balls.

3. The ball bearing of claim 1 wherein said guide channels for load carrying balls are open radially inward and said axially extending guide channels for non-load carrying balls are closed radially inward.

4. The ball bearing of claim 1 wherein said outer sleeve is comprised of a cylindrically rolled flat sheet.

5. The ball bearing of claim 1 wherein said outer sleeve is formed of cylindrically rolled sheet metal.

6. The ball bearing of claim 4 wherein said sleeve has axially extending abutting edges, and further comprising means for holding said abutting edges to the other.

7. In the linear ball bearing of claim 5 wherein said sleeve of cylindrically rolled sheet metal has axially extending abutting edges, and the mid-section intermediate the axial ends of said outer sleeve is continuous between said abutting edges.

8. The linear ball bearing of claim 1 wherein said outer sleeve has axially extending channels radially aligned with said axially extending races for non-load-carrying balls.

9. In a linear ball bearing comprising a cage having a plurality of ball guides, each ball guide having axially extending guide channels for load-carrying and non-load carrying balls and semicircular channels connecting pairs of said guide channels together, endless rows of balls disposed in said ball guides, and an outer sleeve extending axially over the cage and having ball races axially extending in its bore, the axially extending races for the non-load-carrying balls extending at a greater diameter of the bearing than the axially extending races for the load-carrying balls, and the axially extending races both for the load-carrying and for the non-load-carrying balls being closed off radially outwardly; the improvement wherein said semicircular channels in the cage have bottoms that rise convexly radially outward toward the circumference of the bearing between each pair of interconnected axially extending guide channels, said convex bottoms having apices between the respective axially extending guide channels, and the outer sleeve has crescent-shaped slots opening radially outward at least at said apices, said axially extending guide channel for both the load-carrying and non-load-carrying balls being opened radially inward.

* * * * *